March 13, 1962     D. E. THOMAS     3,025,468
NULL TYPE TRANSISTOR BETA MEASURING SET
Filed Nov. 17, 1959     2 Sheets-Sheet 1

INVENTOR
D. E. THOMAS
BY
R. B. Ardis
ATTORNEY

March 13, 1962 D. E. THOMAS 3,025,468
NULL TYPE TRANSISTOR BETA MEASURING SET
Filed Nov. 17, 1959 2 Sheets-Sheet 2

INVENTOR
D. E. THOMAS
BY
*R. B. Ardis*
ATTORNEY

3,025,468
NULL TYPE TRANSISTOR BETA MEASURING SET
Donald E. Thomas, Madison, N.J., assignor to Bell Telephone Laboratories, Incorporated, New York, N.Y., a corporation of New York
Filed Nov. 17, 1959, Ser. No. 853,477
7 Claims. (Cl. 324—158)

This invention relates generally to the measurement of the electrical operating parameters of transistors and more particularly to the measurement of the common emitter current amplification factor (beta) of a transistor whose common base current amplification factor (alpha) is greater than unity.

A principal object of the invention is to increase the accuracy of measurement of the common emitter current amplification factor (beta) where the common base current amplification factor (alpha) of the transistor under tests is greater than unity.

Another and more particular object is to free the accuracy of transistor beta measurements where alpha is greater than unity from dependence upon the accuracy with which the magnitude of a current or a voltage can be determined by a meter reading.

Still another object of the invention is to free the accuracy of beta measurement where alpha is greater than unity from dependence upon constancy in signal generator level.

A further object is to permit the common emitter current amplification factor (beta) of transistors, whose common base current amplification factor (alpha) is greater than unity, to be measured more accurately than it can be computed from measured values of alpha.

An additional object is to provide for the automation of the measurement of transistor beta where alpha is greater than unity.

In the fundamental study of the current amplification characteristics of transistors, attention is usually directed to the common base amplification factor (alpha), which is defined as the ratio of collector current to emitter current while the collector is shorted to the base. Usually alpha is less than unity in a junction transistor, but with increasing collector voltage the field and the number of carriers are increased and the collector barrier narrows. With increasing collector voltage the collector current eventually exceeds the emitter current and alpha becomes greater than unity. Of more interest to the circuit designer concerned primarily with common emitter transistor circuits, however, it is the common emitter current amplification factor (beta), which is defined as the ratio of collector current to base current while the collector is shorted to the emitter. In the past, beta, where alpha has been either less than or greater than unity, has usually been computed from measured values of alpha by the formula $$\beta = \frac{\alpha}{1-\alpha}$$

or has been determined by instruments which measure the ratio of the voltage across a standard resistance in the collector circuit to the voltage across a standard resistance in the base circuit. The former technique is inherently inaccurate in that relatively small errors in the value of alpha are reflected as much greater percentage errors in the computed value of beta. The latter technique involvs the use of a sensitive voltmeter, and dependence upon extreme constancy of signal level and upon the accuracy of the meters and the accuracy with which the meters can be read.

The present invention overcomes limitations of the prior art and takes the form of a direct-reading null-type transistor measuring set for the measurement of beta where alpha is greater than unity, the accuracy of which is substantially independent of the signal level. In accordance with a principal feature of the invention a variable resistance is connected between the base electrode and the collector electrode of the transistor to be tested, a signal source is connected between the transistor emitter electrode and a first terminal of a two terminal resistance of fixed value, the collector electrode is connected to the second terminal of the fixed resistance, and a null-reading voltage measuring device is connected between the transistor base and the first terminal of the fixed resistance. When the resistance of the variable resistor is adjusted to give a null reading on the voltage measuring device, beta is a function of the value of the variable resistance. In general, beta is given by the negative sum of one plus the ratio of the variable resistance to the fixed resistance. Since the voltage measuring means is used only to provide a null reading, measuring accuracy is freed from dependence upon the accuracy with which a meter can be read. The variable resistance is capable of being calibrated with much more precision than a meter and, furthermore, remains calibrated once it has been calibrated. Fluctuations in the signal level do not affect the accuracy of measurement, since the position of null balance is independent of signal level over a considerably large signal level.

The chief advantage of this type of measurement over conventional beta measuring teachniques is that its calibration depends only upon the setting of a linear resistance and is therefore independent of changes in signal level and meter accuracy. Successful use of null techniques to measure transistor beta is shown by the measuring set disclosed and claimed in the present inventor's copending application Serial No. 827,837 which was filed on July 17, 1959. The apparatus disclosed in copending application 827,837 is primarily adapted to the measurement of the value of beta in a transistor whose common base current amplification factor (alpha) is less than unity. The present invention permits beta to be measured by null techniques where the value of alpha of the transistor under test is greater than unity.

In accordance with another feature of the invention, a high-gain frequency selective amplifier tuned to the frequency of the signal generator and having a suitable output indicating meter may be used as the null-reading voltage measuring device. The signal-to-noise ratio of the null indicator is thereby improved and the detection of extremely low level signals is permitted.

In accordance with still another feature of the invention servo techniques may be employed to balance the null detector automatically. In accordance with this feature of the invention, an A.-C. servo motor has its shaft position-coupled to the linearly calibrated control of the variable resistance. An A.-C. signal generator supplies power to the power phase of the servo motor and a signal which is injected between the emitter electrode and the fixed resistor. The control phase of the servo motor is fed by the output of a servo amplifier whose input is connected between the base electrode of the transistor and the first terminal of the fixed resistor. The signal between the base electrode and the first terminal of the fixed resistor amplified by the servo amplifier, drives the servo motor until the variable resistor setting is such that the voltage becomes zero, thus giving an automatic indication of the value of beta in terms of the setting of the potentiometer.

The invention will be more fully understood from the following detailed description of preferred embodiments thereof taken in conjunction with the appended drawings in which.

Figure 1:
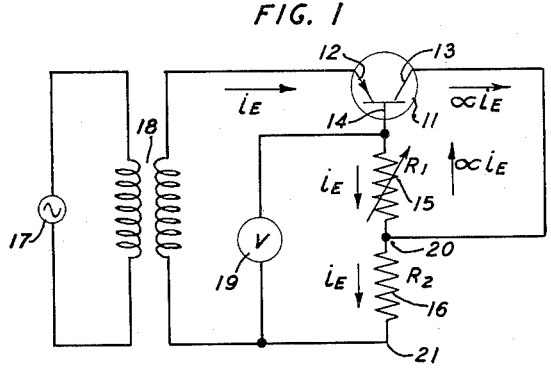
FIG. 1 illustrates the basic alternating current transistor beta measuring circuit featured by the present invention.

The embodiment of the invention shown in FIG. 1 includes a junction transistor 11 having an emitter electrode 12, a collector electrode 13 and a base electrode 14. The conventional symbols used for transistors employ an arrowhead to indicate the emitter electrode and the direction of positive current flow is indicated by the direction of the arrow. Thus a transistor of the P-N-P type is indicated by an emitter arrow pointing toward the base while a transistor of the N-P-N type is indicated by an emitter arrow pointing away from the base. The transistor shown in this and succeeding figures are, by way of example, P-N-P transistors, but it should be understood that the invention is applicable to the measurement of values of $\alpha$ of transistors of the opposite conductivity type as well. For currents of the N-P-N type, currents flow in directions opposite to those shown in the drawings and all D.-C. bias supply polarities are reversed.

The circuitry shown in the embodiment of the invention shown in FIG. 1 omits provision for direct current biasing for the sake for simplicity. The circuit as shown includes, in addition to transistor 11, a two terminal variable resistor 15, a two terminal resistor of fixed value 16, a signal generator 17, a transformer 18, and a voltmeter 19. The variable resistor 15 is connected between the base electrode 14 and the collector electrode 13. The collector electrode is also connected to one terminal 20 of the fixed resistor 16. A small signal alternating current signal is applied to the emitter electrode 12 by means of signal generator 17 and transformer 18.

In the embodiment of the invention shown in FIG. 1 the small signal alternating emitter current $i_e$ is returned to the secondary winding of transformer 18 through variable resistor 15 and fixed resistor 16. Due to transistor action the collector current is $\alpha i_e$, where $\alpha$ is the common-base current amplification factor of transistor 11. The collector current, $\alpha i_e$, flows back into the base electrode through the variable resistor 15.

When the variable resistor 15 has its resistance adjusted so that a null reading is obtained on voltmeter 19 connected across resistors 15 and 16 the following equation holds for transistors whose values of $\alpha$ are greater than unity $$i_e(R_1+R_2) - \alpha i_e(R_1) = 0$$

$$\alpha = \frac{R_1+R_2}{R_1}$$

$$\beta = \frac{\alpha}{1-\alpha} = \frac{\frac{R_1+R_2}{R_1}}{1-\left(\frac{R_1+R_2}{R_1}\right)} = -\frac{R_1+R_2}{R_2}$$

$$\beta = -\left[1+\frac{R_1}{R_2}\right] \quad (1)$$

where $R_1$ is the value of the variable resistance at which a null balance is obtained and $R_2$ is the resistance of the fixed resistor 16. The significance of the negative sign of Equation 1 is that the phase of the common emitter current gain is reversed when $\alpha > 1$.

$R_1$ is a variable resistor linearly calibrated from zero to maximum resistance in terms of a linear scale of $n$ divisions, thus making $\beta_0$ a linear function of the resistance setting. If $n_0$ is the setting of the variable resistor when the voltage across resistors 15 and 16 is zero then $$\beta_0 = -\left[1+\frac{n_0 R_{1\,max}}{nR_2}\right]$$

where $R_{1max}$ is the maximum resistance of variable resistor 15. This apparatus can be made to read values of beta directly for $\beta_0$ greater than unity. For example, if $R_2 = 10\Omega$ and the maximum value of $R_1 = 1000\Omega$ and $n = 1000$ then $$\beta_0 = -[1 + n_0 \times 10^{-1}]$$

and $\beta_0$ is read for values of $\beta_0$ from 1.000 to 101.

Figure 2:
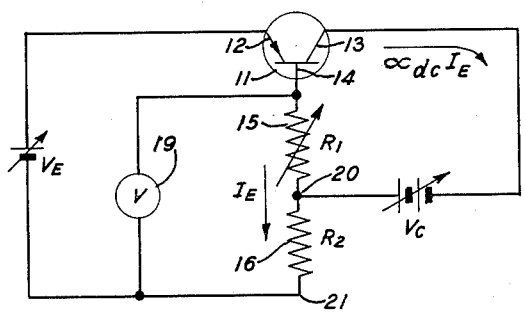
FIG. 2 illustrates an embodiment of the invention for measuring the direct current value of beta, $\beta_{dc}$.

FIG. 2 illustrates an embodiment of the invention for measuring the D.-C. value of beta, $\beta_{dc}$, where alpha is greater than unity. The circuit is similar to the circuit shown in FIG. 1, except for the fact that only D.-C. currents and D.-C. voltages are present since the signal generator 17 and transformer 18 have been eliminated.

The collector is reverse biased by a battery connected between the collector and the junction of resistors 15 and 16. The emitter is forward biased by means of a direct current source connected between the emitter and terminal 21 of resistor 16. The D.-C. emitter current is $I_e$ and flows through resistors 15 and 16. Due to transistor action the collector current is $\alpha_{dc}I_e$, and the collector current is returned to the base electrode through variable resistor 15. When the D.-C. voltage across resistors 15 and 16 as indicated by voltmeter 19 is made zero by adjusting the variable resistor 15 then $$I_E(R_1+R_2) - \alpha_{dc}I_E(R_1) = 0$$

$$\alpha_{dc} = \frac{R_1+R_2}{R_1}$$

$$\beta_{dc} = \frac{\alpha_{dc}}{1-\alpha_{dc}} = -\left[1+\frac{R_1}{R_2}\right] \quad (2)$$

Equation 2 is the same as Equation 1 so that calibration and readout conditions are the same for the circuits of FIGS. 1 and 2. In the operation of the $\beta_{dc}$ measuring set as illustrated in FIG. 2, the collector voltage and emitter current are adjusted to the operating point at which $\beta_{dc}$ is to be measured, the variable resistor is adjusted until D.-C. voltmeter 19 reads zero and $\beta_{dc}$ is read directly from the setting of the linearly calibrated control of the variable resistor 15, the resistor having previously been calibrated.

Figure 3:
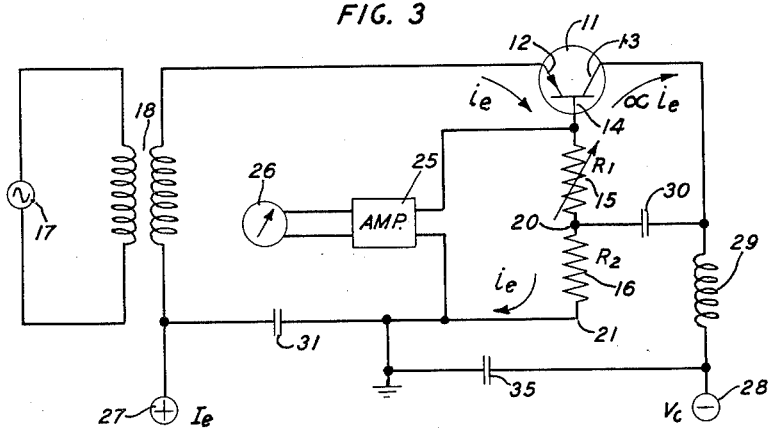
FIG. 3 illustrates an embodiment of the invention which provides for greater accuracy of measurement.

The embodiment of the invention shown in FIG. 3 provides for more accurate determination of $\beta$. For completeness, D.-C. biasing circuits are shown in FIG. 3, as well as the necessary A.-C. circuitry. The null-detecting device is, in this embodiment of the invention, a high gain amplifier 25 with an indicating meter 26 connected across its output. The amplifier 25 is tuned to the frequency of signal generator 17 permitting the detection of extremely low level signals, so that it is possible to set variable resistor 15 with a high degree of precision. The emitter electrode 12 of transistor 11 is provided with a substantially constant current bias by a D.-C. high impedance source 27 which is poled to bias the emitter electrode in the forward direction. The collector electrode of transistor 11 is supplied with a substantially constant voltage bias by a low impedance D.-C. source 28 which is poled to bias the collector in the reverse direction and which is connected to the collector by means of choke 29. Condensers 30, 31 and 35 are D.-C. blocking A.-C. bypass condensers. Choke 29 prevents any A.-C. collector signal current from bypassing the resistor 15 and producing an error in measurement.

In the operation of the beta measuring set as illustrated in FIG. 3, the variable resistor is adjusted until the output meter reads zero, and beta is read directly from the setting of the variable resistor, the resistor having previously been calibrated.

Figure 4:
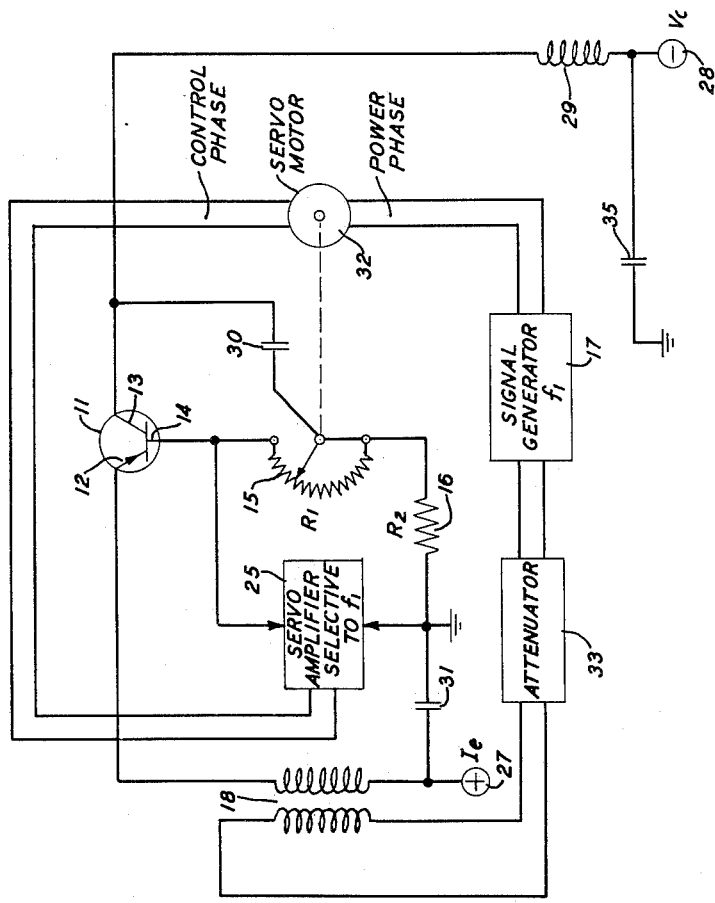
FIG. 4 illustrates an embodiment of the invention adapted for automatic operation.

An embodiment of the invention in which the previously calibrated variable resistor is set automatically to provide a null output is illustrated in FIG. 4. The null voltage detection means in FIG. 4 consists of a servo amplifier 25 tuned to the frequency of signal generator 17. The output of the servo amplifier 25 feeds the control phase of servo motor 32 whose shaft is angular-position-coupled to the shaft of the variable resistor of the measuring set. The power phase of servo motor 32 is fed from the same signal generator 17 which supplies the input signal to the transistor as this is necessary in order to tie both the frequency and phase of the transistor input signal to those of the power phase of the servo motor. Since the power required to operate servo motor 32 is much greater than that used to provide a signal at the transistor emitter electrode, an attenuator 33 is connected between the signal generator 17 and transformer 18. A signal at the input of servo motor 32 drives servo motor 32 until the input signal becomes zero, thus balancing the measuring set and giving an automatic indication of the value of beta. If it is desired to obtain a printed record of the values of alpha an analog to digital converter may be connected to the variable resistor, and the values of beta may be indicated in digital form automatically.

In a similar manner the embodiment of the invention shown in FIG. 2 may be made more accurate by replacing the null detecting means by a D.-C. amplifier with an indicating meter connected to its output to indicate when a null balance is achieved. Similarly, the D.-C. amplifier may be used to drive a D.-C. servo motor whose shaft is angular-position-coupled to the variable resistor to achieve automatic balancing of the measuring set.

The automation of both the $\beta_0$ and $\beta_{dc}$ measuring sets may be further extended by mechanically connecting a commutator to the shaft of the servo motor as shown in the present inventor's U.S. Patent No. 2,847,645, issued August 12, 1958. Transistors are thereby measured and sorted automatically in accordance with the values of beta measured at any preselected operating point.

It is to be understood that the above-described arrangements are illustrative of the application of the principles of the invention. Numerous other arrangements may be devised by those skilled in the art without departing from the spirit and scope of the invention.

What is claimed is:

1. In combination with a transistor having an emitter electrode, a collector electrode, a base electrode, and a common base current amplification factor greater than unity, an arrangement for measuring the common emitter current gain of said transistor which comprises means to supply direct operating potentials to said electrodes, a variable resistor connected between said base electrode and said collector electrode, a two terminal resistor of fixed resistance having one of said terminals connected to said collector electrode, an input signal source connected between said emitter electrode and the second terminal of said resistor of fixed resistance, and null-reading voltage measuring means connected between said base electrode and said second terminal of said resistor of fixed resistance.

2. In combination with a transistor having an emitter electrode, a collector electrode, a base electrode, and a common base current amplification factor greater than unity, an arrangement for measuring the common emitter current gain of said transistor which comprises means to bias said emitter electrode in the forward direction, means to bias said collector electrode in the reverse direction, a variable resistor having a linearly calibrated control connected between said base electrode and said collector electrode, a two terminal resistor of fixed resistance one of said terminals being connected to said collector electrode, an input signal source connected between said emitter electrode and the second terminal of said resistor of fixed resistance, null-reading voltage measuring means connected between said base electrode and said second terminal of said resistor of fixed resistance, whereby the common emitter current amplification factor of said transistor is represented by the setting of the linearly calibrated control of said variable resistor at which a null indication is obtained on said voltage measuring means, and the accuracy of representation is independent of fluctuations in the amplitude of the signal produced by said source.

3. In combination with a transistor having an emitter electrode, a collector electrode, a base electrode, and a common base current amplification factor greater than unity, an arrangement for measuring the common emitter current gain of said transistor which comprises means to bias said emitter electrode in the forward direction, means to bias said collector electrode in the reverse direction, a variable resistor having a linearly calibrated control connected between said base electrode and said collector electrode, a two terminal resistor of fixed resistance one of said terminals being connected to said collector electrode, a substantially single frequency input signal source connected between said emitter electrode and the second terminal of said resistor of fixed resistance, null-reading voltage measuring means, and frequency selective amplifying means tuned to pass the frequency of said source having its input connected between said base electrode and said second terminal of said resistor of fixed resistance and its output connected to said voltage measuring means, whereby the common emitter current amplification factor of said transistor is represented by the setting of the linearly calibrated control of said variable resistor at which a null indication is obtained on said voltage measuring means even for low level signals from said source.

4. In combination with a transistor having an emitter electrode, a collector electrode, a base electrode, and a common base current amplification factor greater than unity, an arrangement for measuring the common emitter current amplification factor of said transistor which comprises means to bias said emitter electrode in the forward direction, means to bias said collector electrode in the reverse direction, a variable resistor having a linearly calibrated control connected between said base electrode and said collector electrode, a two terminal resistor of fixed resistance one of said terminals being connected to said collector electrode, a signal source connected between said emitter electrode and the second terminal of said resistor of fixed resistance, an alternating current servo motor having a power phase, a control phase and a shaft position coupled to said linearly calibrated control of said variable resistor, means connecting the power phase of said servo motor to said signal source, and means connecting the control phase of said servo motor between said base electrode and said second terminal of said resistor of fixed resistance whereby the common emitter current amplification factor of said transistor is represented by the setting of said movable control on said variable resistor when said servo motor comes to rest.

5. A combination, in accordance with claim 4, which includes a commutator having a plurality of segments and a contact arm angular-position-coupled to said servo motor, a plurality of hoppers corresponding to respective ones of said commutator segments and means responsive to the position of said shaft and said linear calibrated control to open the one of said hoppers corresponding to the rest setting of said linearly calibrated control.

6. In combination with a transistor having an emitter electrode, a collector electrode, a base electrode, and a common base current amplification factor greater than unity, an arrangement for measuring the direct current common emitter amplification factor of said transistor which comprises a two terminal variable resistor one of said terminals being connected to said base electrode, means to bias said collector electrode in the reverse direction connected between said collector electrode and said second terminal of said variable resistor, a two terminal resistor of fixed resistance one of said terminals being connected to said second terminal of said variable resistor, means to bias said emitter electrode in the forward direction connected between said emitter electrode and said second terminal of said fixed resistor, and null-reading voltage measuring means connected between said base electrode and said second terminal of said fixed resistor.

7. In combination with a transistor having an emitter electrode, a collector electrode, a base electrode, and a common base current amplification factor greater than unity, an arrangement for measuring the direct current common emitter amplification factor of said transistor which comprises, a two terminal variable resistor having a linearly calibrated control for linearly varying its resistance and having one of said terminals connected to said base electrode, means to bias said collector electrode in the reverse direction connected between said collector electrode and said second terminal of said variable resistor, a two terminal resistor of fixed resistance one of said terminals being connected to said second terminal of said variable resistor, means to bias said emitter electrode in the forward direction connected between said emitter electrode and said second terminal of said fixed resistor, null-reading direct current voltage measuring means connected between said base electrode and said second terminal of said fixed resistor whereby said common emitter direct current amplification factor of said transistor is represented by the position of said linearly calibrated control of said variable resistor at which a null indication is obtained on said voltage measuring means.

References Cited in the file of this patent

UNITED STATES PATENTS

| | | |
|---|---|---|
| 2,847,645 | Thomas | Aug. 12, 1958 |
| 2,850,699 | Davidson et al. | Sept. 2, 1958 |
| 2,894,206 | Montgomery | July 7, 1959 |